(12) United States Patent
Ruehle

(10) Patent No.: US 6,748,412 B2
(45) Date of Patent: Jun. 8, 2004

(54) SQUARE-AND-MULTIPLY EXPONENT PROCESSOR

(75) Inventor: Michael D. Ruehle, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 177 days.

(21) Appl. No.: 09/964,137

(22) Filed: Sep. 26, 2001

(65) Prior Publication Data

US 2003/0093453 A1 May 15, 2003

(51) Int. Cl.$^7$ ................................................ G06F 7/38
(52) U.S. Cl. ........................................ 708/606; 708/491
(58) Field of Search ................................. 708/606, 491

(56) References Cited

U.S. PATENT DOCUMENTS

| | | | | |
|---|---|---|---|---|
| 6,240,436 B1 | * | 5/2001 | McGregor | 708/491 |
| 6,282,290 B1 | * | 8/2001 | Powell et al. | 708/851 |
| 6,434,585 B2 | * | 8/2002 | McGregor et al. | 708/491 |

FOREIGN PATENT DOCUMENTS

EP    0 947 914 A1    10/1998

OTHER PUBLICATIONS

Knuth, Donald Ervin; The Art of Computer Programming; Mar. 2000, 6th Printing; pp. 461–464.
Walter C.D.; Exponentiation Using Division Chains; IEEE Transactions on Computers, IEEE Inc.; New York, U.S.; vol. 47, No. 7; Jul. 1, 1998, pp. 757–765.

* cited by examiner

*Primary Examiner*—Tan V. Mai
(74) *Attorney, Agent, or Firm*—Blakely, Sokoloff, Taylor & Zafman LLP

(57) ABSTRACT

Processing exponents with a square-and-multiply technique that uses a flexible number of bits in the multiply stages. Multiple bits of the exponent can be handled in a single multiply operation, thus reducing the total number of multiply operations required to raise a number to a specified power. By examining prior and subsequent bits in the exponent in addition to the current bit, the quantity of bits that are handled in a particular multiply operation can be adjusted to the particular pattern of 1's and 0's in the exponent.

20 Claims, 5 Drawing Sheets

SQUARE-AND-MULTIPLY EXPONENT PROCESSOR

BACKGROUND OF THE INVENTION

1. Field of the Invention

The invention pertains generally to computers. In particular, it pertains to processing exponents electronically using an improved square-and-multiply technique.

2. Description of the Related Art

Several computer applications involve exponentiation, or the process of raising a base number to a power, where the exponent is a very large number. This is particularly true in some encryption/decryption schemes, such as the well-known Rivest-Shamir-Adleman (RSA) approach to public key encryption. The security of this system increases as the number of bits in the exponents increases. Current RSA implementations of public key encryption commonly use exponents with 1024 bits. As increasingly powerful computers become available for code-breaking efforts, the size of these numbers will most likely increase even more to maintain the same level of security.

The square-and-multiply technique has been developed to more efficiently process exponentiation when using binary numbers. In the conventional approach to this technique, each bit of the exponent is examined sequentially, starting with the most significant bit (MSB), and the current value of the process is operated on. Before starting, the base number (the number being raised to a power) represents the current value; after that, the result of the previous operation represents the current value. If the bit being examined in the exponent is a zero, the current value of the process is squared. If the bit being examined is a one, the current value of the process is both squared and multiplied by the original base number. The number of operations involved in this process equals the total number of bits in the exponent, plus the number of '1' bits in the exponent, minus one. Thus, the average number of operations for a 1024-bit exponent would be 1535, assuming an equal number of ones and zeros in the average exponent. Since the base number typically involves large numbers in an encryption algorithm, each operation is a large and potentially time-consuming step if implemented in hardware, and even more time-consuming if implemented in software. The time to execute a conventional square-and-multiply approach increases linearly with the number of bits in the exponent, which can become a bottleneck in response times for those applications that use RSA encryption in interactive communications or other time-sensitive applications.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

Figure 1:
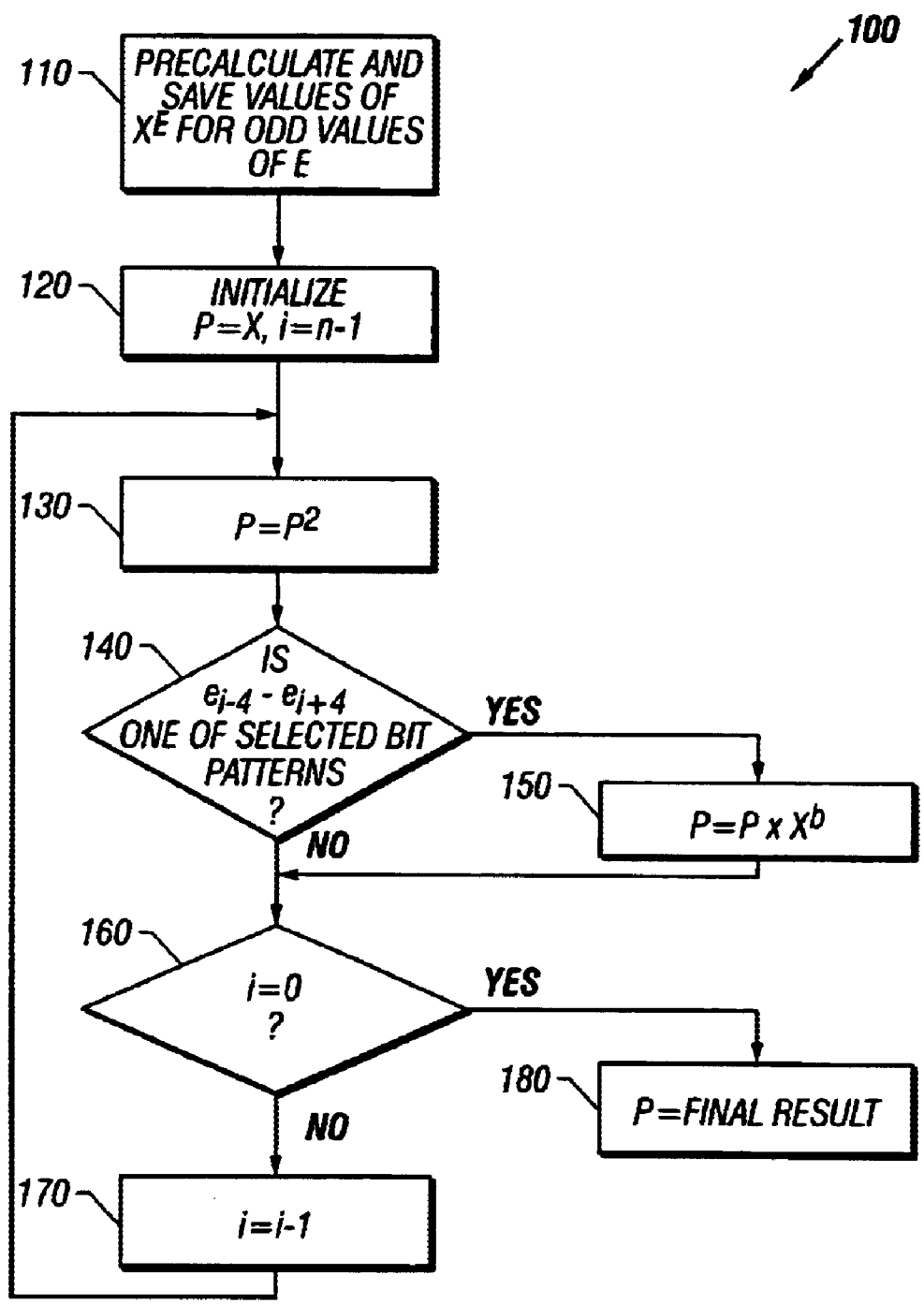
FIG. 1 shows a flow chart of a method according to one embodiment of the invention.

Various embodiments of the invention may reduce the number of operations required to implement a square-and-multiply approach when large exponents are involved. Multiple '1' bits in the exponent may be processed with a single multiply operation rather than using a separate multiply operation for each '1' bit. By examining groups of bits, the number of bits that is handled in a single multiply operation can be varied based on the particular pattern of bits involved. Before beginning the square-and-multiply process, a table of values for exponentiated base numbers is pre-calculated and stored so that the multiplicand in each multiply operation will be known and can be retrieved from the table rather than calculated each time it is needed, thus reducing the total number of operations that might otherwise be required. In one embodiment, a circuit for examining the bit patterns in the exponent is used to optimize the number of bits included in each multiply operation.

The following illustrates the operations that are involved in a method or circuit to calculate $X^E$ for some odd-valued n-bit exponent E, with up to five bits of the exponent being involved in each multiplication. The exponents are shown in binary format.

Pre-Calculate $X^E$, Where E is Limited to Odd Numbers with up to 5 Bits:

| | |
|---|---|
| 0. Store: | $X = X^1$ |
| 1. Square and store: | $X^1 \times X^1 = X^{10}$ |
| 2. Multiply and store: | $X^1 \times X^{10} = X^{11}$ |
| 3. Multiply and store: | $X^{11} \times X^{10} = X^{101}$ |
| 4. Multiply and store: | $X^{101} \times X^{10} = X^{111}$ |
| 5. Multiply and store: | $X^{111} \times X^{10} = X^{1001}$ |
| 6. Multiply and store: | $X^{1001} \times X^{10} = X^{1011}$ |
| 7. Multiply and store: | $X^{1011} \times X^{10} = X^{1101}$ |
| 8. Multiply and store: | $X^{1101} \times X^{10} = X^{1111}$ |
| 9. Multiply and store: | $X^{1111} \times X^{10} = X^{10001}$ |
| 10. Multiply and store: | $X^{10001} \times X^{10} = X^{10011}$ |
| 11. Multiply and store: | $X^{10011} \times X^{10} = X^{10101}$ |
| 12. Multiply and store: | $X^{10101} \times X^{10} = X^{10111}$ |
| 13. Multiply and store: | $X^{10111} \times X^{10} = X^{11001}$ |
| 14. Multiply and store: | $X^{11001} \times X^{10} = X^{11011}$ |
| 15. Multiply and store: | $X^{11011} \times X^{10} = X^{11101}$ |
| 16. Multiply and store: | $X^{11101} \times X^{10} = X^{11111}$ |

The value of $X^{10}$ was used only to calculate the remaining values and may be discarded, leaving a table with 16 entries that cover all the odd values of E up to five bits. These seventeen operations give all the possible values of the base number X raised to an odd power, with a limit of five bits in the exponent. Other sizes of exponents may result in other sizes of tables. For example, limiting the exponent to six bits can result in a table of 32 values, with 33 pre-calculation steps, but may later require fewer multiply operations during the square-and-multiply phase because up to six bits of the exponent can be handled in a single multiply operation.

The following example shows how the pre-calculated table may be used in the exponentiation of X. For this example, E is the 20-bit number:

E=1011 0010 1000 1001 1010

In one embodiment, all bits of the exponent are examined sequentially, beginning with the most significant bit. In another embodiment, the first step is to start with a power of X that encompasses as many of the most significant bits as are found in the table. In this example, that would be the four MSBs '1011', and the value for $X^{1011}$ is retrieved directly from the table. Since the next bit is a '0', this value is squared as shown in step 17 below. From that point on, the remaining bits of the exponent are examined sequentially, one at a time from most to least significant. For each bit examined, whether it is a '1' or '0', the current value of the operation is squared. However, if the current bit being examined is a '1', the multiply step may be performed or may be deferred until a group of '1' bits can be included in the multiplication. In this example, the 20 bits of the exponent trigger the following operations:

| | | |
|---|---|---|
| 17. Square: | $X^{1011} \times X^{1011}$ | $= X^{10110}$ |
| 18. Square: | $X^{10110} \times X^{10110}$ | $= X^{101100}$ |
| 19. Square: | $X^{101100} \times X^{101100}$ | $= X^{1011000}$ |
| 20. Square: | $X^{1011000} \times X^{1011000}$ | $= X^{10110000}$ |
| 21. Square: | $X^{10110000} \times X^{10110000}$ | $= X^{101100000}$ |
| 22. Multiply: | $X^{101100000} \times X^{101}$ | $= X^{101100101}$ |
| 23. Square: | $X^{101100101} \times X^{101100101}$ | $= X^{1011001010}$ |
| 24. Square: | $X^{1011001010} \times X^{1011001010}$ | $= X^{10110010100}$ |
| 25. Square: | $X^{10110010100} \times X^{10110010100}$ | $= X^{101100101000}$ |
| 26. Square: | $X^{101100101000} \times X^{101100101000}$ | $= X^{1011001010000}$ |
| 27. Square: | $X^{1011001010000} \times X^{1011001010000}$ | $= X^{10110010100000}$ |
| 28. Square: | $X^{10110010100000} \times X^{10110010100000}$ | $= X^{101100101000000}$ |
| 29. Square: | $X^{101100101000000} \times X^{101100101000000}$ | $= X^{1011001010000000}$ |
| 30. Square: | $X^{1011001010000000} \times X^{1011001010000000}$ | $= X^{10110010100000000}$ |
| 31. Multiply: | $X^{10110010100000000} \times X^{10011}$ | $= X^{10110010100010011}$ |
| 32. Square: | $X^{10110010100010011} \times X^{10110010100010011}$ | $= X^{101100101000100110}$ |
| 33. Square: | $X^{101100101000100110} \times X^{101100101000100110}$ | $= X^{1011001010001001100}$ |
| 34. Multiply: | $X^{1011001010001001100} \times X^{1}$ | $= X^{1011001010001001101}$ |
| 35. Square: | $X^{1011001010001001101} \times X^{1011001010001001101}$ | $= X^{10110010100010011010}$ |

Thus by deferring multiplication until a group of '1' bits could be accumulated, and using the precalculated odd powers of $X^E$ in those multiplications, the number of multiply steps in this example was reduced from 9 to 3. For exponents with a small number of bits, the added pre-calculation steps may exceed the reduction in multiply steps, rendering this approach less efficient than the conventional approach. But for large exponents, the total number of operations may be greatly reduced over conventional techniques. The optimum number of pre-calculated values to be placed in the table depends on the number of bits in E, with a larger number of bits in the exponent justifying a larger pre-calculated table.

FIG. 1 shows a flow chart 100 of a method according to one embodiment of the invention. At block 110, a table of values for $X^E$ is computed for odd values of E. At block 120, the parameters to be used are initialized. P represents the accumulated value previously described. The initial value of P is set to the base number X. 'i' represents the bit position in the n-bit exponent E that is to be examined next, so i=n−1 represents the most significant bit position and i=0 represents the least significant bit position. $e_i$ represents the actual bit that occupies bit position i.

At block 130, the current value of P is squared, and the result becomes the new value of P. Since the square operation occurs for every bit in the exponent, regardless of the bit's value, the square operation may be performed without regard for the value of $e_i$.

In another embodiment, previously described but not shown in FIG. 1, the most significant five bits of the exponent are examined to find the largest matching pattern in the table, P is initialized to the value matching that pattern, and i is initialized to (n−the number of bits represented by that value). This approach saves a few operations, but requires more complicated logic.

Unlike conventional systems, which trigger a multiply by X every time bit $e_i$ is a '1', various embodiments of the invention can defer the multiply operation until a group of bits in the exponent has been evaluated. Therefore in block 140, bit $e_i$ and a group of bits surrounding it are evaluated to determine if a multiply operation is warranted. In this example, the inclusion of four bits on either side of $e_i$ is determined by the fact that the pre-calculated table was created using 5-bit exponents, and up to 5-bit multiplicands in the exponent are used to trigger the multiplications. The general rule is that for a table constructed using y-bit exponents, the multiplications can accommodate up to a y-bit power, and the bits to be concurrently evaluated in block 140 are the current bit +/−(y−1) bits. Therefore, not only is the current bit examined, but the following (y−1) bits are also examined to determine if more '1' bits will be included in the pattern, while the preceding (y−1) bits are also examined in case they are part of a previously deferred pattern that is still under consideration.

Block 140 examines the current bit $e_i$, the following four bits, and the preceding four bits to detect one of the pre-determined bit patterns. If any of the pre-determined bit patterns is detected, block 150 multiplies P by $X^b$, where b is a part of the detected bit pattern and consists of the 5-bit exponent represented in the table. If none of the predetermined bit patterns is detected, the multiply operation is not performed. In either case, block 160 determines if the final (least significant) bit of the exponent has been processed, which is the case if i=0. If yes, P is now the final answer at block 180 and represents the quantity $X^E$. If not, i is decremented at block 170 so that the next current bit to be considered will be the bit immediately to the right of the just-examined current bit. Execution then jumps to block 130 to continue the process until all bits of the exponent have been examined.

Figure 2:
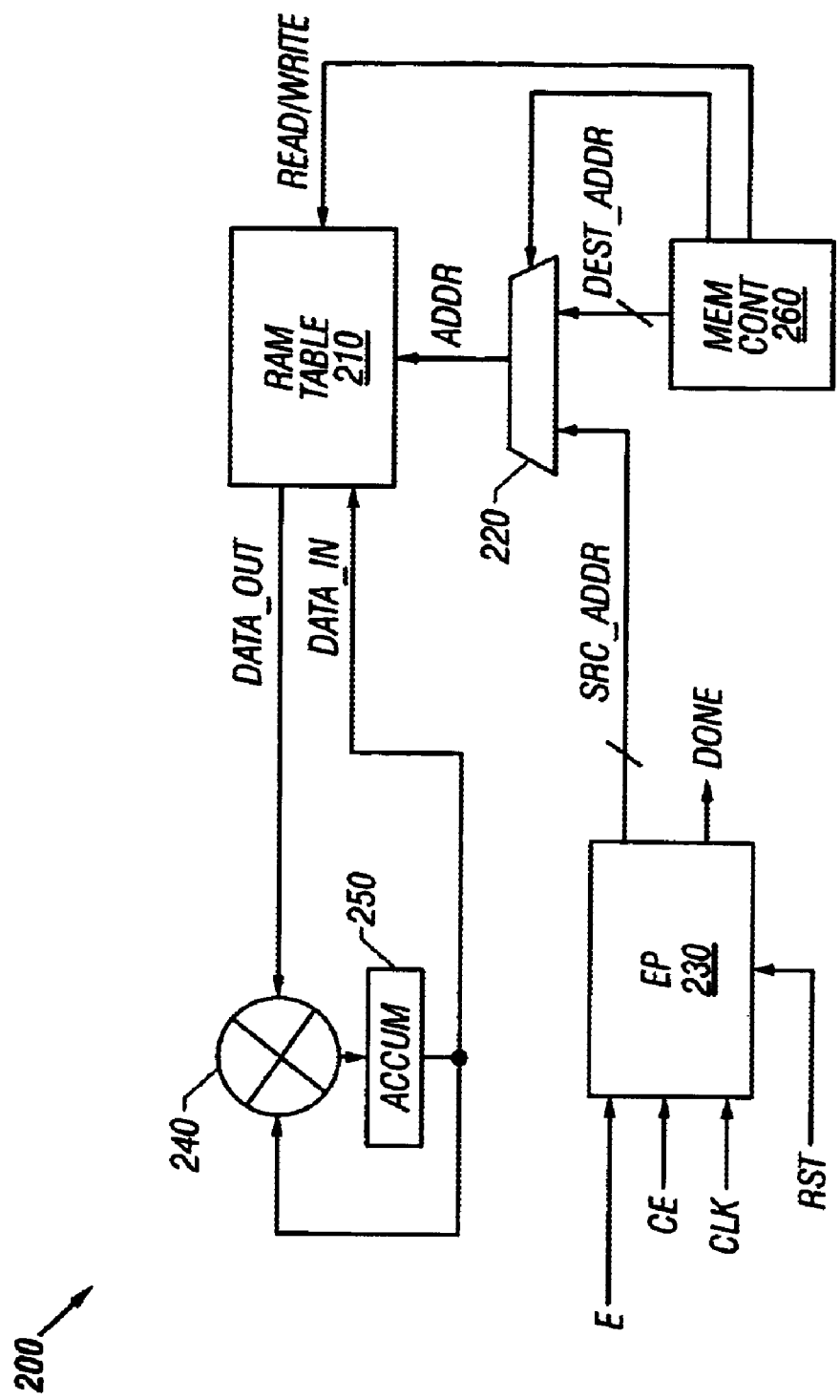
FIG. 2 shows a block diagram of an exponentiation circuit according to one embodiment of the invention.

FIG. 2 shows a block diagram of an exponentiation circuit 200, according to one embodiment of the invention. In one embodiment, random access memory (RAM) table 210 is used to store the pre-calculated values of $X^E$, but other types of storage may also be used to store the table. In the embodiment of FIG. 2, multiplier 240 is a circuit that multiplies the two numbers received at its two inputs, and produces their product at its output. The product is stored in accumulator 250, which in one embodiment is a register. The output of accumulator 250 is fed back into one of the inputs of multiplier 240, so that the value in accumulator 250 is an accumulated product, i.e., each multiplication operates on the previous product and replaces the previous product with the new product. The other input of multiplier 240 is a value read from table 210 over the DATA_OUT lines. The new output of accumulator 250 maybe written into a selected location of table 210 over the DATA_IN lines.

In one embodiment, to square the value that is in the accumulator (see block 130 of FIG. 1), the value is written into a specified location, then read from that same location as an input to multiplier 240, which multiplies it by the accumulator value to produce the squared value and places that squared value into accumulator 250. To multiply the value in the accumulator by a second value (see block 150 of FIG. 1), the second value may be read from a different location of RAM table 210 as an input to multiplier 240, which again places the product in accumulator 250. In one embodiment, exponent processor 230 determines which stored value is selected as an input to multiplier 240 by placing the address of the stored value on the source address (SRC_ADDR) lines. The bits of the exponent E are placed into exponent processor 230, which examines those bits in groups to detect the necessary bit patterns for a multiply operation, and the address placed on the SRC_ADDR lines depends on which pattern is detected. In one embodiment, memory controller 260 causes multiplexer 220 to select the SRC_ADDR lines and may also provide a 'read' signal to the RAM table 210, causing the selected value to be read from RAM table 210. When the pre-calculated values are being calculated and stored in RAM table 210, memory controller 260 provides the destination address (DEST_ ADDR) for the write location and causes multiplexer 220 to select those lines as an address to RAM table 210, while also providing a 'write' signal to specify a write operation to RAM table 210.

The memory device used to store RAM table 210 may have any suitable configuration. In one embodiment, the DATA_IN and DATA_OUT lines are the same lines, and standard memory bus architecture is used to share the input and output functions over the same lines. In one embodiment, a counter or other control logic (not shown) is used to increment the address during the pre-calculation phase. Although a single memory location may be used for each entry, the size of the numbers stored into table 210 may require multiple memory locations for each table entry. In one embodiment, 1024-bit numbers are stored and the RAM is 16 bits wide, so 64 consecutive locations are used for each number. Any references to table entries or memory locations in this disclosure encompass the configurations that use multiple memory locations per table entry.

In one embodiment, the circuit of FIG. 2 is also used to perform the pre-calculations necessary for creating the contents of RAM table 210. For example, the base value X may be initially loaded into accumulator 250 and also stored in location 0000 of table 210. These two values are then multiplied together with multiplier 240 to form $X^{10}$, which is stored in location 10000 of table 210. Since $X^{10}$ is now in accumulator 250, it is next multiplied by X from location 00000 to produce $X^{11}$ in the accumulator, and that value is stored in location 00001. Each of the remaining calculations then multiply $X^{10}$ from location 10000 by the value in accumulator 250 to produce, $X^{101}$, $X^{111}$, ... $X^{11111}$, which are stored in consecutive locations 00010 through 01111. After all 16 pre-calculated values of $X^E$ have been determined and stored in table 210, the circuit is ready to begin operating on the bits of exponent E.

The following chart shows the operations that are followed in one embodiment. For consistency, binary notation is shown for all addresses and exponents.

For each step, the accumulator value is the first input to the multiplier 240, the source address specifies which RAM table location is read to provide the second input to the multiplier 240, the output of the multiplier 240 is placed into the accumulator 250 as the new result, and the destination address specifies which location in RAM table 210 has the result written into it.

In the embodiment of the example, in step 1 the base value X is loaded into accumulator 250. Since this is a load operation, the inputs and output of multiplier 240 are irrelevant and may be ignored. As a part of the load operation, the new contents X of accumulator 250 are also written to location 00000 in the RAM table. In step 2, a multiply function multiplies the contents (X) of the accumulator by the contents of (X) of location 00000, producing a value of $X^{10}$ in the accumulator. This result is written to location 10000 of the RAM table, where it may be used for most of the remaining pre-calculation steps. In step 3, another multiply function multiplies the contents ($X^{10}$) of the accumulator by the contents (X) of location 00000, producing a value of $X^{11}$ in the accumulator, and that value is written to location 00001. In step 4, another multiply function multiplies the contents ($X^{11}$) of the accumulator by the contents ($X^{10}$) of location 10000, producing a value of $X^{101}$ in the accumulator, and that value is written to location 00002. The remaining steps 5–17 follow the form of step 4, in which the value in the accumulator is multiplied by the contents of address 10000 ($X^{10}$), and the results are written to a destination address that increments with each operation.

In one embodiment, steps 1–17 produce the RAM table 210 of 16 odd powers of X, which may subsequently be accessed during the exponentiation phase. Other embodiments may have other sizes of tables, which may require a different number of steps to produce. As a general rule, the number of steps required for pre-calculation is equal to the number of table entries plus one.

In one embodiment, the pre-calculation steps 1–17 are predetermined, i.e., they follow the same process every time, just using a different base number. Once the pre-calculations are finished, step 18 begins the process of exponentiation. The exponentiation steps may vary depending on the value of the exponent being processed. In one embodiment, to begin an initial value is loaded into the accumulator at step 18, and that value written to location 10000. The remaining

| Step | Function | Acc value | Src addr | Src value | Dest addr | Dest value |
|------|----------|-----------|----------|-----------|-----------|------------|
| 1 | Load | — | — | — | 00000 | X |
| 2 | Mult | X | 00000 | X | 10000 | $X^{10}$ |
| 3 | Mult | $X^{10}$ | 00000 | X | 00001 | $X^{11}$ |
| 4 | Mult | $X^{11}$ | 10000 | $X^{10}$ | 00010 | $X^{101}$ |
| 5 | Mult | $X^{101}$ | 10000 | $X^{10}$ | 00011 | $X^{111}$ |
| 6 | Mult | $X^{111}$ | 10000 | $X^{10}$ | 00100 | $X^{1001}$ |
| 7 | Mult | $X^{1001}$ | 10000 | $X^{10}$ | 00101 | $X^{1011}$ |
| 8 | Mult | $X^{1011}$ | 10000 | $X^{10}$ | 00110 | $X^{1101}$ |
| 9 | Mult | $X^{1101}$ | 10000 | $X^{10}$ | 00111 | $X^{1111}$ |
| 10 | Mult | $X^{1111}$ | 10000 | $X^{10}$ | 01000 | $X^{10001}$ |
| 11 | Mult | $X^{10001}$ | 10000 | $X^{10}$ | 01001 | $X^{10011}$ |
| 12 | Mult | $X^{10011}$ | 10000 | $X^{10}$ | 01010 | $X^{10101}$ |
| 13 | Mult | $X^{10101}$ | 10000 | $X^{10}$ | 01011 | $X^{10111}$ |
| 14 | Mult | $X^{10111}$ | 10000 | $X^{10}$ | 01100 | $X^{11001}$ |
| 15 | Mult | $X^{11001}$ | 10000 | $X^{10}$ | 01101 | $X^{11011}$ |
| 16 | Mult | $X^{11011}$ | 10000 | $X^{10}$ | 01110 | $X^{11101}$ |
| 17 | Mult | $X^{11101}$ | 10000 | $X^{10}$ | 01111 | $X^{11111}$ |
| 18 | Load | — | — | ? | 10000 | ? |
| 19 | Mult (sq) | P | 10000 | P | 10000 | $P^{10}$ |
| 20 | Mult (mult) | P | (b − 1) / 10 | $X^b$ | 10000 | $PX^b$ |
| ... | | | | | | | steps may take either of two forms, which are exemplified in steps 19 and 20. If the operation to be performed is a square (as shown in step 19), the value in the accumulator (designated as P for this example) is multiplied by the contents of location 10000 (which also contains P). The result is the square of the previously accumulated value P, which is then placed in accumulator 250. The result in the accumulator is then written back to location 10000. This operation represents the function in block 130 of FIG. 1. If the operation to be performed is a multiply by one of the pre-calculated numbers (as shown in step 20), the value in the accumulator is multiplied by the value at the selected source address (a value designated as $X^b$ in this example), with the product being stored in the accumulator. In one embodiment, the selected source address is (b−1)/2 (i.e., b−1, shifted right by one bit), where b is the odd-valued 5-bit exponent used to calculate the stored value at that location. The result is then written back to location 10000. This operation represents the function in block 150 of FIG. 1. Thus, after any operation, the accumulated value is found in both the accumulator and location 10000 of the RAM table 210. When all operations have been completed, the final result is also in both the accumulator and in location 10000 of the RAM table 210.

Multiplier 240 may be of any type. In one embodiment, multiplier 240 requires multiple clock cycles for each operation or step and includes control logic for its operation. In one embodiment, multiplier 240 is a Montgomery multiplier.

Figure 3:
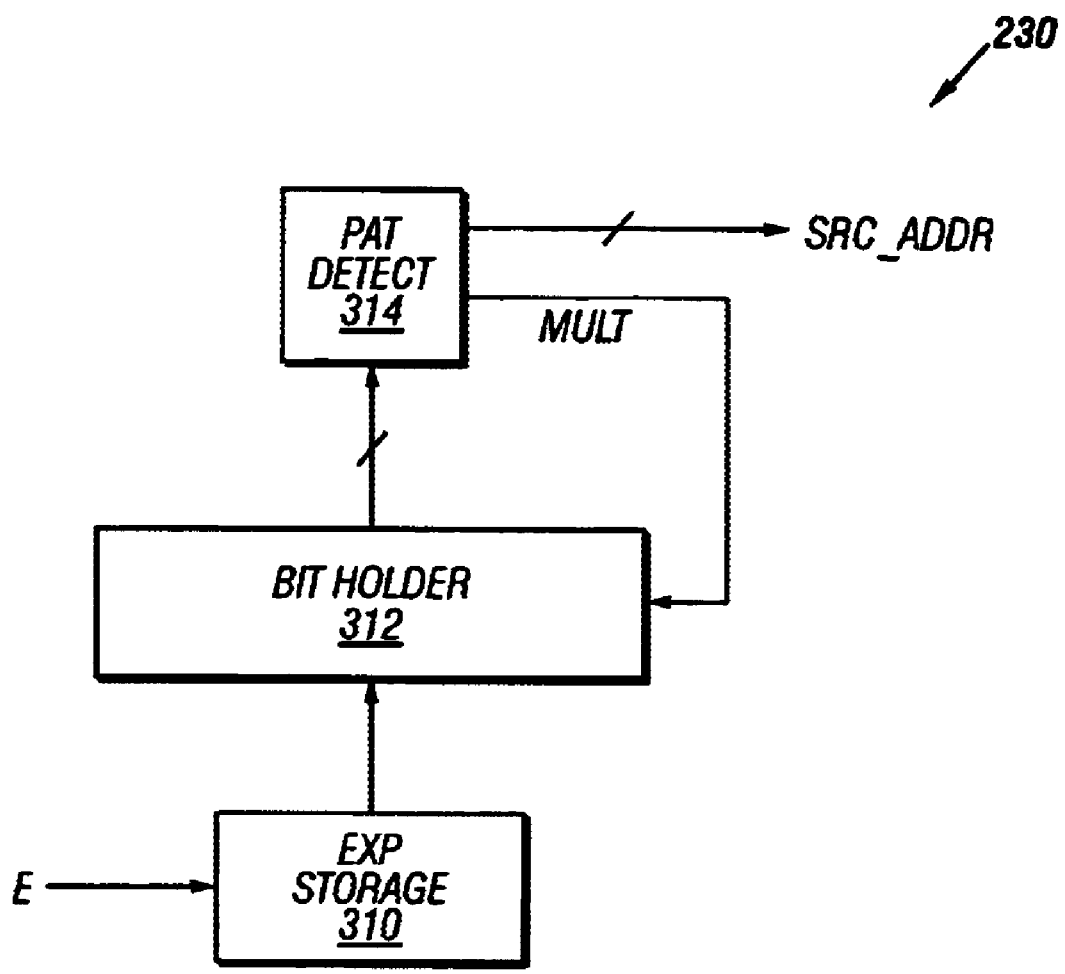
FIG. 3 shows a block diagram of an exponent processor according to one embodiment of the invention.

FIG. 3 shows a block diagram of an exponent processor 230 according to one embodiment of the invention. In the illustrated embodiment of FIG. 3, the exponent to be processed is loaded into exponent storage 310 and then moved into bit holder 312 in small sections to be examined. In one embodiment, exponent storage 310 is large enough to hold the entire exponent at one time. In other embodiments, exponent storage 310 is only large enough to hold a portion of the exponent at one time. As the first portion of the exponent is passed on to bit holder 312, a second portion is loaded into exponent storage 310 to occupy the space vacated by the first portion. In this manner, exponent storage 310 may be kept reasonably small, even for very large exponents, and the size of the exponents may be increased without redesigning exponent storage 310.

In the illustrated embodiment of FIG. 3, bit holder 312 contains the portion of the exponent that is examined for predetermined bit patterns. In one embodiment, bit holder 312 includes a serial-in parallel-out shift register that shifts in the bits of the exponent one bit at a time from exponent storage 310 and presents those bits in parallel for pattern detector 314. For the previous example of a system having a table of 16 values and up to a five-bit multiplicand, the shift register includes nine stages to present nine consecutive bits to pattern detector 314 at one time. As the bits reach the end of the shift register, they may be discarded.

In one embodiment, pattern detector 314 examines multiple bit positions in bit holder 312 in parallel. When a pattern is detected that warrants a multiply operation, the MULT signal is returned to bit holder 312 to trigger any necessary changes in its operation. At the same time, the address of the table location containing the multiplicand in this multiply operation is placed on the SRC_ADDR lines so that the multiplicand may be read from memory.

Figure 4:
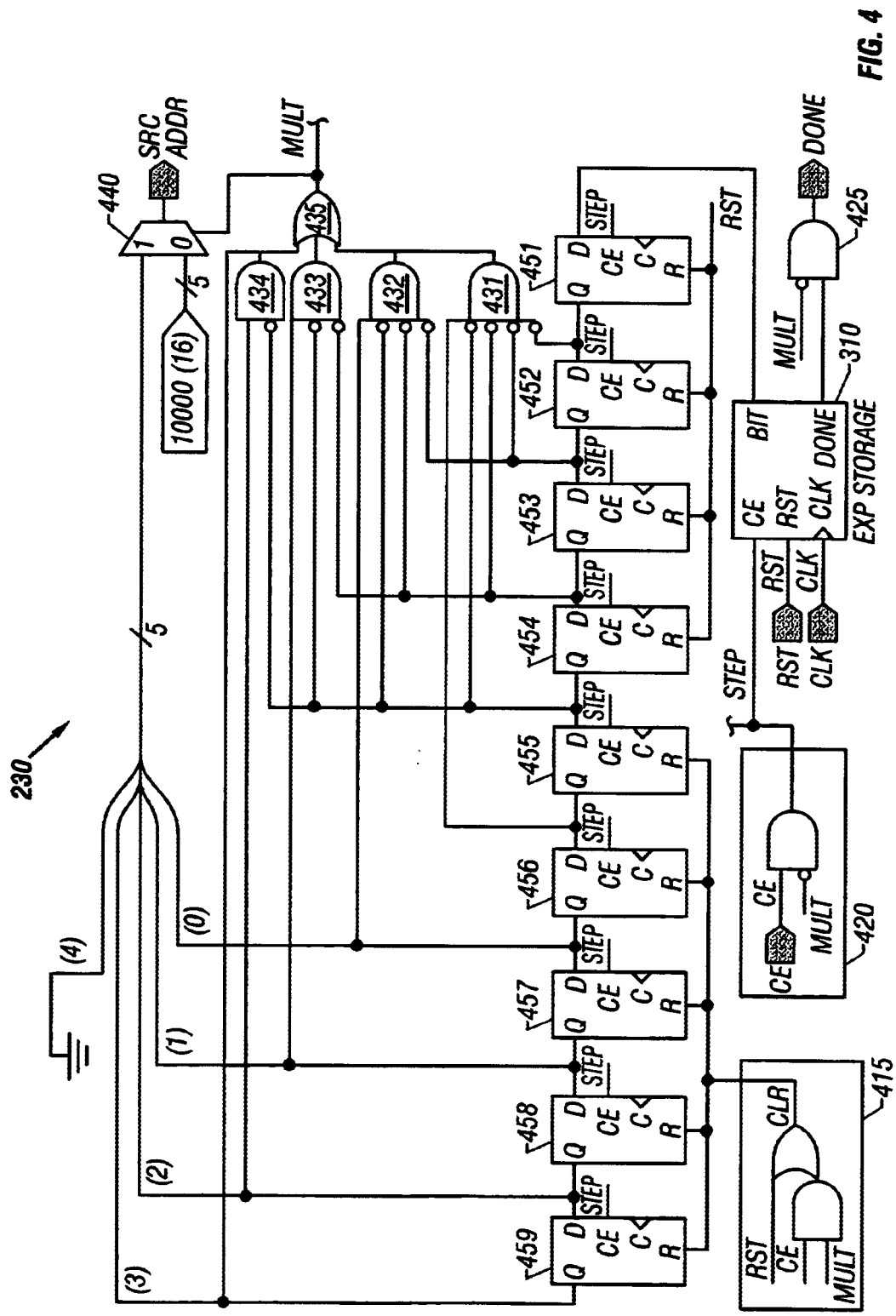
FIG. 4 shows a schematic of an exponent processor according to one embodiment of the invention.

FIG. 4 shows a schematic of exponent processor 230, according to one embodiment of the invention. In the illustrated embodiment of FIG. 4, exponent processor 230 examines the bit patterns in the exponent, and determines when a multiply operation is warranted and which value in table 210 is to be selected for the multiply operation. The embodiment shown has five external signal connections: three single-bit inputs RST, CLK, and CE, one single-bit output DONE, and one five-bit output SRC_ADDR. RST is the reset signal that initializes this and other circuits. CLK is the free-running clock signal that operates and synchronizes this and other circuits, while CE is the clock enable signal that determines which clock pulses are used by this circuit and which are ignored. DONE is an output signal to external control logic that the current exponentiation is complete. SRC_ADDR is an address that selects the source address of RAM table 210.

In the illustrated embodiment of FIG. 4, flip-flops 451–459 form a serial-in parallel-out shift register and are used to store and shift the bits of the exponent that are being evaluated at any given time. The exponent is initially loaded into exponent storage 310, where it is shifted out one bit at a time into flip-flop 451, which shifts it to flip-flop 452, then to flip-flop 453, etc. In one embodiment, exponent storage 310 includes a shift register. In one embodiment, exponent storage 310 holds only a portion of the exponent, and may be reloaded as the current portion is shifted out.

In one embodiment, the exponent is shifted out from the BIT output of exponent storage 310 from the most significant bit first to the least significant bit last. To place the bits in conventional order in FIG. 4, flip-flops 451–459 are shown shifting the data from right to left, so that the bit positions in the diagram are displayed in the conventional format of most significant bits to the left and least significant bits to the right. Shift control circuit 420 causes the bits to be shifted out of exponent storage 310 and through the flip-flops by using the STEP signal on the associated clock enable inputs. Each pulse of the STEP signal shifts one bit of data out of exponent storage 310 and through each flip-flop 451–459. In one embodiment, center flip-flop 455 contains the current bit $e_i$ described earlier, while flip-flops 456–459 contain bits $e_{i+1}$, $e_{i+2}$, $e_{i+3}$, and $e_{i+4}$, respectively, and flip-flops 454–451 contain bits $e_{i-1}$, $e_{i-2}$, $e_{i-3}$, and $e_{i-4}$, respectively. The contents of these nine flip-flops may be examined to detect certain predetermined bit patterns that trigger a multiply operation. Any other bit pattern may result in only a square operation. In the illustrated embodiment, a '1' bit must reach the center flip-flop 455 before a multiply operation is considered. Depending on the contents of the other flip flops, the multiply operation may be executed at that time or may be deferred until more '1' bits can be included. The total number of multiplications to be performed may be minimized by maximizing the number of '1' bits included in each multiplication. Therefore, when EP 230 detects that the current bit $e_i$ is a '1', it may also examine the following four bits to determine if there are additional '1's, and defer multiplication until those addition '1's pass through bit $e_i$. However, the multiplication must take place before any of the '1' bits passes out of the circuit and is lost, so the four bits preceding $e_i$ are also kept in the circuit and preserved for use. In the illustrated embodiment, the bits in the four most significant flip-flops 456–459 are used to form the source address in a multiply operation by selecting a particular pre-calculated value from table 210. After a multiply operation takes place, these flip-flops are cleared so that there is no chance that the same '1' bit will be used in more than one multiply operation.

In the embodiment of FIG. 4, gates 431–435 detect the bit patterns shown below, where x='don't' care'. When one of these bit patterns is detected, the MULT signal is asserted. The MULT signal initiates a multiply operation, whereas the absence of the MULT signal initiates a square operation.

| gates 331, 335: | xxxx10000 |
| gate 332, 335: | xxx1x000x |
| gate 333, 335: | xx1xx00xx |
| gate 334, 335: | x1xxx0xxx |
| gate 335: | 1xxxxxxxx |

Shift circuit 420 asserts the STEP pulse for each assertion of the clock enable signal CE, thus causing the bits of the exponent to advance through the circuit. However, a MULT signal disables the STEP signal, allowing a multiply operation to take place without advancing the bits. This is in keeping with the square-and-multiply process of performing a square for every bit in the exponent, while also performing a multiply operation when '1' bits are encountered. Since the multiply operations are performed separately from the square operations, the shift function is inhibited to keep the bits in their proper place while a multiply operation is taking place.

In one embodiment, clearing circuit 415 asserts the signal CLR to reset flip-flops 459–455. CLR is asserted during a system reset by the signal RST (which clears all the flip-flops), or whenever a multiply operation takes place when CE and MULT are both asserted. Asserting CLR causes any '1' bits in those bit positions to be cleared out after they are involved in a multiply operation, which has the effect of preventing each '1' bit from being involved in more that one multiply operation. This clearing of flip-flops on a multiply operation is why the detection gates 431–435 do not need to examine every bit. Certain bit patterns will never propagate past a certain point in the chain of flip-flops because their leading 1's will be cleared by a multiply operation, eliminating any need to later check for those 1's at certain bit positions. For example, the pattern xxxx10000 triggers an immediate multiply operation (through gate 431), since another '1' bit won't appear in the center position until the existing '1' bit has shifted out of the flip-flops. This multiply operation resets the '1'bit to a '0'. Gate 432 checks for pattern xxx1x000x, with a 'don't care' in the center bit. Gate 432 won't see the pattern xxx10000x, with a '0' in the center bit, since the '1' bit would have been previously reset when gate 431 triggered a multiply operation. Therefore, gate 432 can only be triggered by the pattern xxx11000x (with a '1' in the center bit), and there is no need to examine the center bit since it may only have one value in the pattern xxx1x000x. By analyzing the other gates in a similar fashion, it may be seen that a multiply operation is only triggered by these gates when there is a '1' in the center bit position (flip-flop 455), and the remaining four flip-flops 459–456 contain any value from 0000 to 1111. This technique of eliminating possible bit patterns can permit a group of 16 5-bit patterns to be detected with only the five gates shown. The contents of the four flip-flops 459–456 are used as the least significant source address bits to read a value out of the first sixteen locations in RAM table 210, and the '1' in flip-flop 455 assures that only odd-number bit patterns will trigger the multiply operation. The illustrated embodiment creates a source address of (b−1)/2, where b is the 5-bit value in flip flops 459–455 when a predetermined bit pattern is detected. The notation (0), (1), (2), (3), and (4) at the top of FIG. 4 indicates the bit positions of the source address. Bit position (4) is held low because this embodiment only reads values from the lowest 16 locations of the table, which requires only four bits in the address.

In one embodiment, when MULT is asserted, multiplexer 440 selects the source address from flip-flops 459–456, so that one of the 16 pre-calculated values is read out of RAM table 210 and used in the multiply operation. When MULT is not asserted, the default address 10000 is selected by multiplexer 440, and the contents of that location are then read and provided to multiplier 240. As previously described, location 10000 may contain the current accumulated value of the product for exponentiations, or $X^{10}$ for pre-calculations.

When the last bit has been shifted out of exponent storage 310, the DONE signal may be asserted to external control circuitry to indicate there are no more bits to examine. Gate 425 may delay the DONE signal if a multiply operation is in progress.

Figure 5:
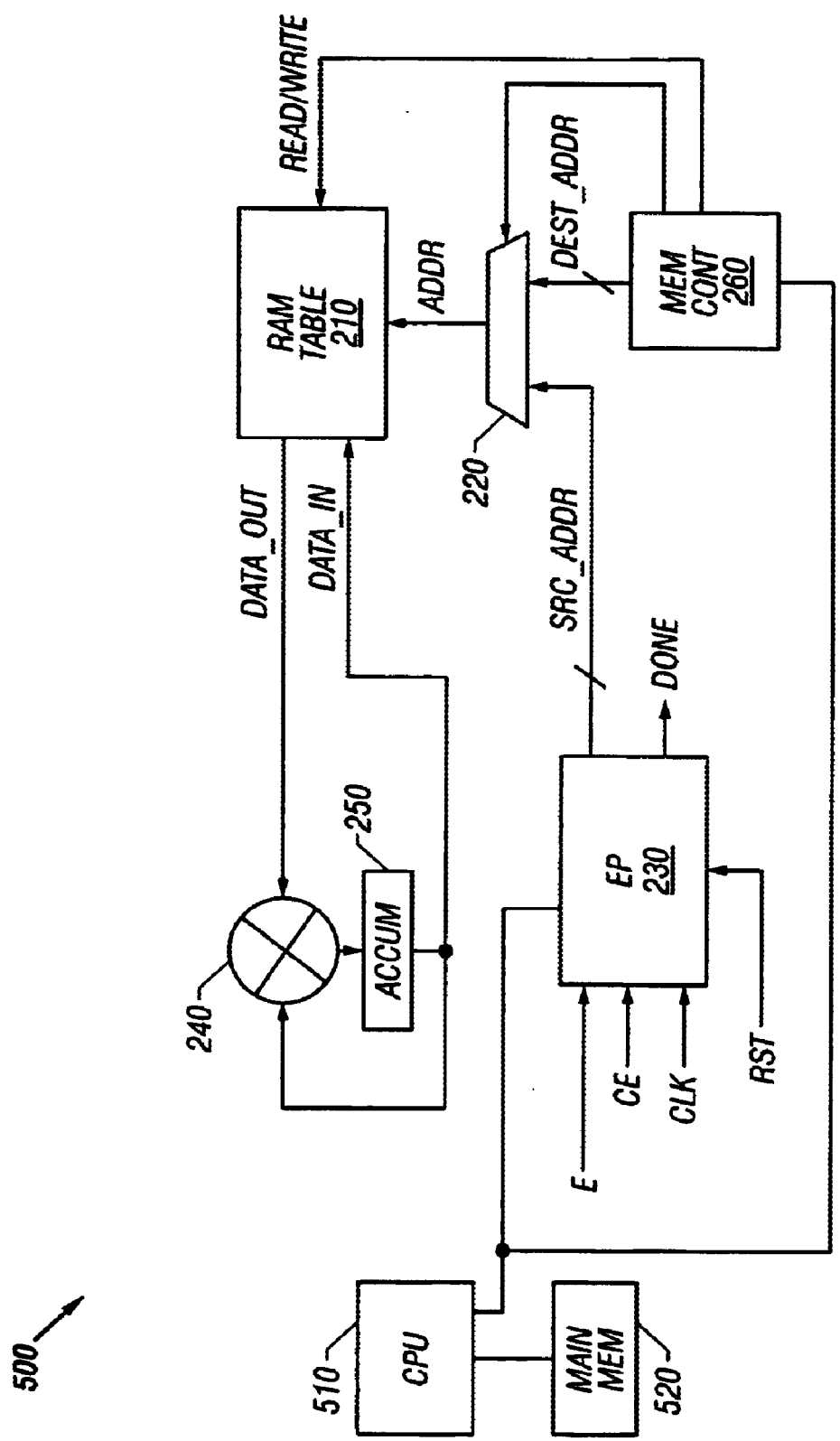
FIG. 5 shows a system according to one embodiment of the invention.

FIG. 5 shows a system 500 according to one embodiment of the invention. In the embodiment of FIG. 5, a central processing unit (CPU) 510 is coupled to exponent processor 230 and is also coupled to memory controller 260. CPU 510 is also coupled to main memory 520, which in this embodiment is separate from RAM table 210. CPU 510 executes instructions located in main memory 520 to provide data and initialization commands to the exponentiation processes performed by exponent processor 230, multiplier 240, accumulator 250, memory controller 260 and RAM table 210, and to receive the results produced by these devices. In one embodiment, main memory 520 includes dynamic random access memory (DRAM). In another embodiment, main memory 520 includes static random access memory (SRAM).

The previously described examples used a table of 16 pre-calculated values based on 5-bit exponents, and the pattern detection was based on 9-bit patterns. Other values may also be used. In one embodiment, the table may contain $(2^m/2)$ pre-calculated values based on m-bit exponents, and the pattern detection may be based on patterns of $(2m-1)$ bits.

The invention may be implemented in circuitry or as a method. The invention may also be implemented as instructions stored on a machine-readable medium, which may be read and executed by at least one processor to perform the functions described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The foregoing description is intended to be illustrative and not limiting. Variations will occur to those of skill in the art. Those variations are intended to be included in the invention, which is limited only by the spirit and scope of the appended claims.

I claim:

1. An apparatus, comprising:
   a bit holding circuit to hold at least a portion of multiple bits of an exponent;
   a pattern detection circuit coupled to the bit holding circuit to detect occurrences of any of a plurality of predetermined bit patterns in the bit holding circuit, the pattern detection circuit comprising a first output to assert a first signal in response to each detection of said occurrences, the pattern detection circuit further comprising a second output to provide one of a plurality of addresses to a storage device in response to said each detection of said occurrences; and
   a multiplexer to provide a default address through the second output upon non-detection of said occurrences.

2. The apparatus of claim 1, wherein:

the bit holding circuit includes a serial-in parallel out shift register.

3. The apparatus of claim 1, wherein:

the storage device is to contain pre-calculated values of a base number raised to a plurality of powers; and each of said plurality of predetermined bit patterns corresponds to a particular one of said plurality of addresses.

4. The apparatus of claim 3, wherein:

the plurality of powers includes only odd-valued powers.

5. The apparatus of claim 3, wherein:

each of said plurality of predetermined bit patterns includes the corresponding particular one of said plurality of addresses.

6. The apparatus of claim 1, wherein:

assertion of the first signal is to indicate a multiply operation to a square-and-multiply circuit; and non-assertion of the first signal is to indicate a square operation to the square-and-multiply circuit.

7. The apparatus of claim 1, wherein:

each of the plurality of bit patterns includes at least two bits.

8. A system, comprising:

a CPU coupled to a main memory;

an exponent processor coupled to the CPU to detect a plurality of predetermined bit patterns in an exponent;

a storage device coupled to the exponent processor to hold pre-calculated values of a base number raised to a plurality of powers; and a multiplier circuit coupled to the storage device to multiply an accumulated value by a selected one of the pre-calculated values from the storage device upon detection of any of the plurality of predetermined bit patterns;

wherein the storage device is to receive one of a plurality of addresses from the exponent processor in response to each detection of said any of the plurality of predetermined bit patterns and is to receive a default address in response to non-detection of said any of the plurality of predetermined bit patterns.

9. The system of claim 8, wherein:

the multiplier circuit is to square the accumulated value upon said non-detection of said any of the plurality of predetermined bit patterns.

10. The system of claim 8, wherein:

each of the plurality of predetermined bit patterns includes at least two bits.

11. The system of claim 8, wherein:

the plurality of powers includes only odd-valued powers.

12. A method, comprising:

providing a base number to be raised to a power specified by an exponent;

setting an accumulated product equal to the base number;

examining all bits of the exponent to detect each of multiple predetermined bit patterns;

squaring the accumulated product for each bit in the exponent; and multiplying the accumulated product by one of multiple pre-calculated powers of the base number for each detection of any of the multiple predetermined bit patterns.

13. The method of claim 12, further comprising:

saving the multiple pre-calculated powers in a memory before said examining, squaring, and said multiplying.

14. The method of claim 13, further comprising:

calculating the multiple pre-calculated powers before said saving.

15. The method of claim 12, wherein:

said multiplying includes removing from subsequent examination all '1' bits used to address the one of multiple pre-calculated powers.

16. The method of claim 12, wherein:

each of said multiple pre-calculated powers is an odd power.

17. A machine-readable medium having stored thereon instructions, which when executed by at least one processor cause said at least one processor to perform operations comprising:

providing a base number to be raised to a power specified by an exponent;

setting an accumulated product equal to the base number;

examining all bits of the exponent to detect each of multiple predetermined bit patterns;

squaring the accumulated product for each bit in the exponent; and multiplying the accumulated product by one of multiple pre-calculated powers of the base number for each detection of any of the multiple predetermined bit patterns.

18. The medium of claim 17, further comprising:

calculating the pre-calculated powers before said examining, said squaring, and said multiplying.

19. The medium of claim 17, wherein:

said multiplying includes removing from subsequent examination all '1' bits used to address the one of multiple pre-calculated powers.

20. The medium of claim 17, wherein:

each of said multiple pre-calculated powers is an odd power.

* * * * *